United States Patent
Mizutani et al.

(10) Patent No.: US 9,747,508 B2
(45) Date of Patent: Aug. 29, 2017

(54) SURROUNDING ENVIRONMENT RECOGNITION DEVICE

(71) Applicant: HONDA MOTOR CO., LTD., Tokyo (JP)

(72) Inventors: Akira Mizutani, Utsunomiya (JP); Douglas A. Brooks, San Antonio, TX (US); David R. Chambers, San Antonio, TX (US); Edmond M. Dupont, San Antonio, TX (US)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 14/808,489

(22) Filed: Jul. 24, 2015

(65) Prior Publication Data

US 2017/0024623 A1   Jan. 26, 2017

(51) Int. Cl.
*G06K 9/00* (2006.01)
*G06K 9/20* (2006.01)

(52) U.S. Cl.
CPC ..... *G06K 9/00825* (2013.01); *G06K 9/00798* (2013.01); *G06K 9/2054* (2013.01)

(58) Field of Classification Search
CPC ........... G06K 9/00825; G06K 9/00798; G06K 9/2054
See application file for complete search history.

(56) References Cited

U.S. PATENT DOCUMENTS

| 2009/0303077 | A1* | 12/2009 | Onome | G08G 1/096716 340/901 |
| 2011/0019922 | A1* | 1/2011 | Hue | G06K 9/00791 382/199 |
| 2012/0014610 | A1* | 1/2012 | Nakashi | G06T 7/73 382/195 |
| 2012/0294484 | A1* | 11/2012 | Kishida | G06K 9/00805 382/103 |

FOREIGN PATENT DOCUMENTS

| JP | 2007-034693 A | 2/2007 |
| JP | 2012-168592 A | 9/2012 |

* cited by examiner

*Primary Examiner* — Amara Abdi

(74) *Attorney, Agent, or Firm* — Westerman, Hattori, Daniels & Adrian, LLP

(57) ABSTRACT

A surrounding environment recognition device includes an image capturing unit that captures a peripheral image, and a traffic signal detecting unit, which sets a search region with respect to the peripheral image, and detects a traffic signal inside of the search region. The search region becomes smaller as the distance from the image capturing unit is farther away.

9 Claims, 3 Drawing Sheets

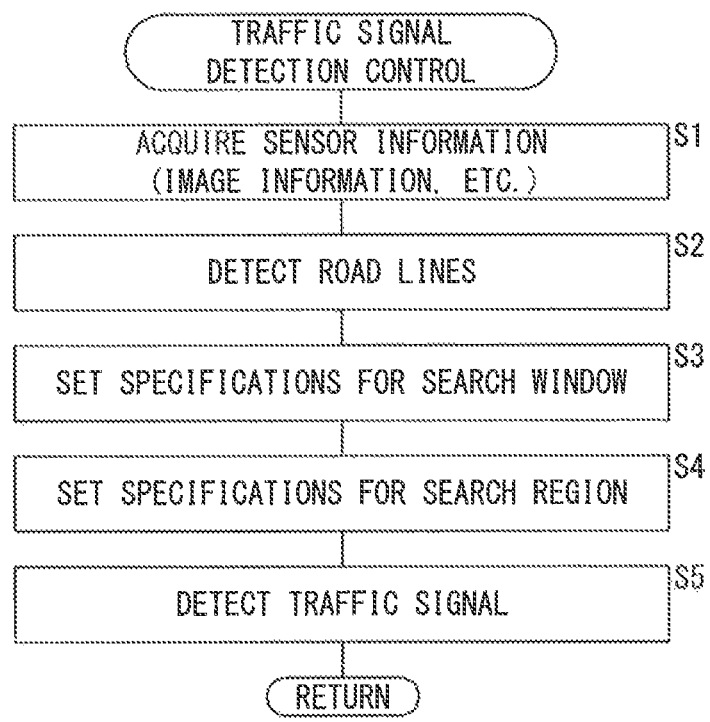

SURROUNDING ENVIRONMENT RECOGNITION DEVICE

BACKGROUND OF THE INVENTION

Field of the Invention

The present invention relates to a surrounding environment recognition device for detecting traffic signal lights using a peripheral image.

Description of the Related Art

Japanese Laid-Open Patent Publication No. 2012-168592 (hereinafter referred to as "JP 2012-168592A") discloses the detection of red light signals Lr and arrow signals A of traffic lights S, based on images T that are captured by an image capturing means 2 (abstract). According to JP 2012-168592A, it is disclosed that, upon detection of an arrow signal A, the recognition method is switched corresponding to the distance to a red light signal Lr (FIG. 15).

Japanese Laid-Open Patent Publication No. 2007-034693 (hereinafter referred to as "JP 2007-034693A") discloses extracting a red color luminance part from an image captured by a front monitoring camera 4, to thereby detect a red signal light of a traffic signal (abstract and paragraph [0017]). Further, in the case that a red signal light is detected, a judgment is made as to whether or not the traffic signal exists on the traveling path of the driver's own vehicle (abstract). Whether or not the traffic signal exists on the path of the driver's own vehicle is judged using map information from a navigation device 11 (paragraph (0027)).

SUMMARY OF THE INVENTION

In each of JP 2012-168592A and JP 2007-034693A, detection of traffic signals is carried out on the basis of searching the entirety of a captured imaged, and therefore, the processing burden is high, or the length of the processing cycle required to carry out searching concerning a specified region is made longer, which in turn influences accuracy in the detection of traffic signals.

The present invention has been devised taking into consideration the aforementioned problems, and has the object of providing a surrounding environment recognition device, in which the processing load can be lightened, or detection accuracy can be improved.

A surrounding environment recognition device according to the present invention includes an image capturing unit that captures a peripheral image, and a traffic signal detecting unit, which sets a search region with respect to the peripheral image, and detects a traffic signal inside of the search region. In particular, the search region becomes smaller as a distance from the image capturing unit is farther away.

According to the present invention, the search region used during detection of the traffic signal becomes smaller as the distance from the image capturing unit is farther away. Therefore, the traffic signal can be detected with a small processing burden or computational load corresponding to the distance from the image capturing unit. Alternatively, by shortening the processing cycle required to carry out searching of the specified region, the detection accuracy at which traffic signals are detected can be improved.

The traffic signal detecting unit may set a search window for searching inside of the search region, and may scan the search window within the search region to thereby detect the traffic signal. In this case, the search window may become smaller as the distance from the image capturing unit is farther away. According to this feature, the traffic signal can be detected accurately by the search window corresponding to the distance from the image capturing unit.

The surrounding environment recognition device may further include a road line recognition device that recognizes a road line, and the traffic signal detecting unit may change a position of the search region corresponding to a position of the road line. According to this feature, by removing from the search region a range in which the traffic signal cannot exist due to the relation thereof with the road line, the computational load can be lightened, or accuracy can be enhanced accompanying shortening of the search cycle.

The road line recognition device may acquire distance information to the traffic signal from an external device or from a storage device incorporated in the vehicle, and may set the search region based on the distance information to the traffic signal. According to this feature, by specifying the distance to the traffic signal using the distance information, and setting the search region based on the distance, the accuracy in detecting the traffic signal can be enhanced, or a reduction in computational load can be realized.

The road line recognition device may acquire height information of the traffic signal from an external device or from a storage device incorporated in the vehicle, and may set the search region based on the height information of the traffic signal. According to this feature, by specifying the height of the traffic signal using the height information, and setting the search region based on the height, the accuracy in detecting the traffic signal can be enhanced, or a reduction in computational load can be realized.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart of the traffic signal detection control process according to the present embodiment.

DESCRIPTION OF THE PREFERRED EMBODIMENTS

A. Embodiment

[A1. Description of Overall Configuration]

(A1-1. Overall Configuration)

Figure 1:
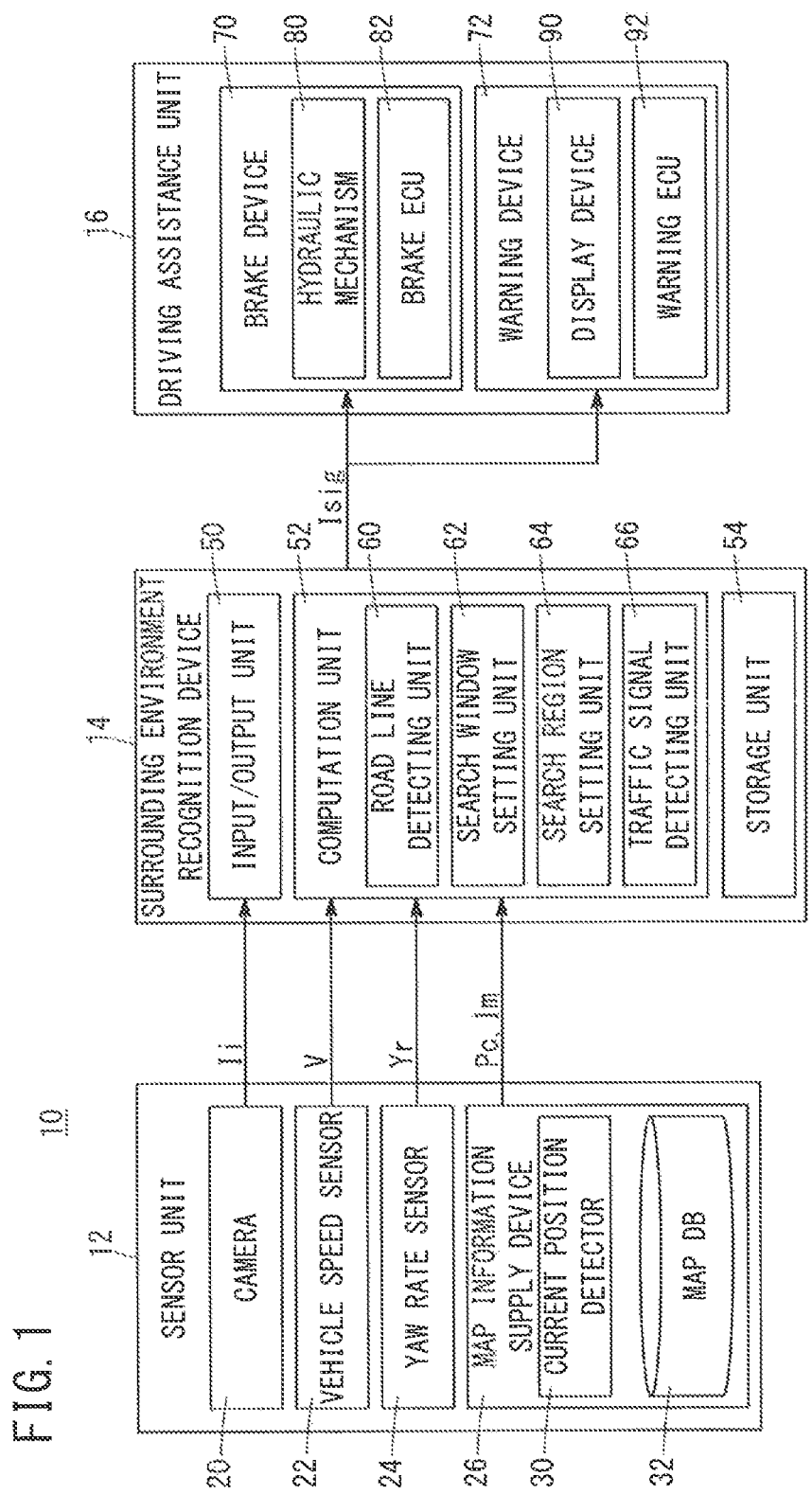
FIG. 1 is a schematic diagram of a vehicle in which a surrounding environment recognition device according to an embodiment of the present invention is incorporated.

FIG. 1 is a schematic diagram of a vehicle 10 in which a surrounding environment recognition device 14 (hereinafter also referred to as a "recognition device 14") according to an embodiment of the present invention is incorporated. As shown in FIG. 1, in addition to the recognition device 14, the vehicle 10 includes a sensor unit 12 and a driving assistance unit 16. In the vehicle 10, a traffic signal 210 (see FIG. 2) is detected by the recognition device 14 based on sensor information Is (such as image information Ii which will be described later) supplied from the sensor unit 12. Information of the detected traffic signal 210 is used in the driving assistance unit 16 for assisting driving of the vehicle 10.

(A1-2. Sensor Unit 12)

The sensor unit 12 acquires the sensor information Is that is used in the recognition device 14 for detecting the traffic signal 210. As shown in FIG. 1, in the sensor unit 12, there are included a camera 20, a vehicle velocity sensor 22, a yaw rate sensor 24, and a map information supply device 26.

The camera 20 is an image capturing unit that captures a peripheral image 100 (see FIG. 2) of the vehicle 10, and outputs image information Ii in relation to the peripheral image 100. The camera 20 is fixed through a non-illustrated bracket to the front windshield or the roof of the vehicle 10. Although in the present embodiment the camera 20 is a color camera, the camera 20 may be a black and white (monochrome) camera, insofar as the camera is capable of detecting the traffic signal 210 (see FIG. 2) based on the peripheral image 100.

The vehicle velocity sensor 22 detects a velocity V [km/h] of the vehicle 10. The yaw rate sensor 24 detects a yaw rate Yr [deg/sec] of the vehicle 10.

The map information supply device 26 supplies map information Im as information (peripheral information) in relation to the surrounding area of the vehicle 10. The map information supply device 26 includes a current position detector 30 and a map information database 32 (hereinafter referred to as a "map DB 32"). The current position detector 30 detects the current position Pc of the vehicle 10. The map DB 32 stores map information Im including the position of the traffic signal 210. The position in this case can be relatively rough or imprecise, which is sufficient to indicate, for example, whether a traffic signal 210 exists at any given intersection. Alternatively, the position Ps of the traffic signal 210 may be comparatively detailed including a front side and a rear side of the intersection, a height H, and lateral (left/right) information, etc. Furthermore, the image information Im may include the form (vertical, horizontal, etc.) of a light emitting section 214 (see FIG. 2) of the traffic signal 210.

The map information supply device 26 calculates a distance Lsmap [m] from the vehicle 10 (camera 20) to the traffic signal 210 based on the current position Pc and the position Ps of the traffic signal 210, and supplies the same as distance information Ilmap to the recognition device 14. In this regard, the distance information Ilmap makes up a portion of the map information Im.

The map information supply device 26 can be constituted, for example, as a navigation device. Alternatively, the map information supply device 26 may be a device that supplies map information Im to the recognition device 14 without performing route guidance in respect to the driver.

(A1-3. Surrounding Environment Recognition Device 14)

The surrounding environment recognition device 14 detects a traffic signal 210 that exists in a direction of travel of the vehicle 10. As shown in FIG. 1, the recognition device 14 includes as constituent hardware thereof an input/output unit 50, a computation unit 52, and a storage unit 54. The recognition device 14 is constituted as an electronic control unit (ECU) including a central processing unit (CPU) or the like. The input/output unit 50 carries out input and output of signals to and from the sensor unit 12 and the driving assistance unit 16.

The computation unit 52 serves to control the recognition device 14 as a whole, and operates by executing programs that are stored in the storage unit 54. Such programs may be supplied from the exterior through a non-illustrated wireless transmission device (portable telephone, smartphone, etc.). Further, a portion of such programs can be constituted by hardware (circuit components).

The computation unit 52 includes a road line detecting unit 60, a search window setting unit 62, a search region setting unit 64, and a traffic signal detecting unit 66. The road line detecting unit 60 detects road lines 240*l*, 240*r* (see FIG. 2) in the direction of travel of the vehicle 10, and outputs road line information Il in relation to the road lines 240*l*, 240*r*. The search window setting unit 62 sets specifications for search windows 230*a* to 230*c* (hereinafter referred to collectively as "search windows 230"). The search region setting unit 64 sets specifications for search regions 232*a* to 232*c* (hereinafter referred to collectively as "search regions 232"). The traffic signal detecting unit 66 detects a traffic signal 210 and outputs traffic signal information Isig in relation to the traffic signal 210. Details of a control (traffic signal detection control) performed in the computation unit 52 will be described later with reference to FIGS. 2 and 3.

The storage unit 54 is constituted by a random access memory (RAM) that temporarily stores data, etc., which is supplied to or from the various computational processes, and a read only memory (ROM), which stores executable programs, tables, or maps, etc.

(A1-4. Driving Assistance Unit 16)

The driving assistance unit 16 carries out driving assistance to assist the driver in driving the vehicle 10 using the calculated results of the recognition device 14. The driving assistance unit 16 includes a brake device 70 and a warning device 72. The brake device 70 serves to control a braking force of the vehicle 10, and includes a hydraulic mechanism 80 and a brake electronic control unit 82 (hereinafter referred to as a "brake ECU 82"). The brake ECU 82 controls the hydraulic mechanism 80 based on the traffic signal information Isig from the recognition device 14. In this regard, braking is assumed to be frictional braking which is carried out using the hydraulic mechanism 80. However, in addition to or in place of frictional braking, a control involving one or both of engine braking and regenerative braking may be performed.

The warning device 72 informs the driver of an illuminated state of the traffic signal 210, in particular, a red light signal (i.e., a state in which a red lamp 224 of the traffic signal 210 is illuminated). The warning device 72 includes a display device 90 and a warning electronic control unit 92 (hereinafter referred to as a "warning ECU 92"). The warning ECU 92 controls the display device 90 based on the traffic signal information Isig from the recognition device 14.

[A2. Various Control]

(A2-1. Outline)

In the vehicle 10 according to the present embodiment, a traffic signal 210 is detected using the surrounding environment recognition device 14. In addition, based on information concerning the detected traffic signal 210, driving assistance is carried out to assist the driver in driving the vehicle 10. Driving assistance includes, for example, in the case that the vehicle is coming too close to a traffic signal 210 displaying a red light, applying automatic braking and informing the driver that the vehicle 10 is approaching the traffic signal 210 with the red light.

Below, the control performed by the surrounding environment recognition device 14 for detecting the traffic signal 210 will be referred to as a "traffic signal detection control". Further, the control performed by the driving assistance unit 16 for assisting driving will be referred to as a "driving assistance control".

(A2-2. Traffic Signal Detection Control)
(A2-2-1. Outline of Traffic Signal Detection Control)

Figure 2:
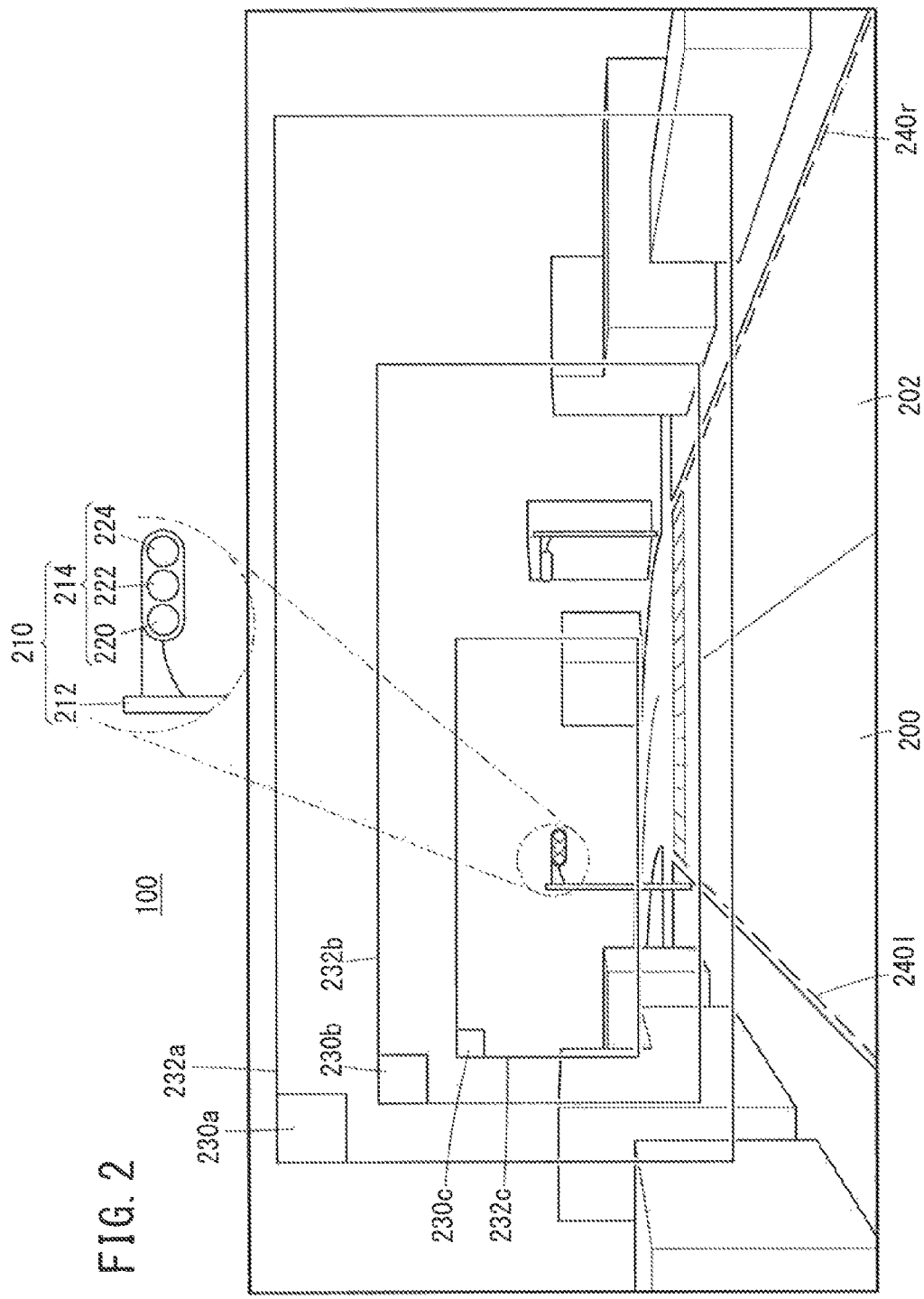
FIG. 2 is a view showing an example of a peripheral image when a traffic signal detection control process is carried out according to the present embodiment.

FIG. 2 is a view showing an example of a peripheral image 100 when a traffic signal detection control process is carried out according to the present embodiment. FIG. 2 illustrates a case in which the vehicle 10 is being driven on a left side of the road. Therefore, a traveling lane 200 of the vehicle 10 (driver's own vehicle) is on the left side of the road, whereas an opposing lane 202 is on the right side of the road. The traffic signal 210 of FIG. 2 includes a supporting post 212 and the light emitting section 214. The light emitting section 214 includes a green lamp 220, a yellow lamp 222, and the red lamp 224. Further, as shown in FIG. 2, in the traffic signal detection control, the plurality of search windows 230a to 230c, and search regions 232a to 232c that correspond to the search windows 230a to 230c are used.

The search windows 230a to 230c set a range over which the traffic signal 210 is searched for, and the search windows 230a to 230c are moved (or scanned) within the search regions 232a to 232c. The method for setting the search windows 230a to 230c will be described below with reference to step S3 of FIG. 3.

The search regions 232a to 232c regulate the range over which the search windows 230a to 230c are moved, and according to the present embodiment, are set to sizes that correspond with the distance L [m] from the camera 20. A method for setting the search regions 232a to 232c will be described below with reference to step S4 of FIG. 3.

(A2-2-2. General Flow of Traffic Signal Detection Control)

FIG. 3 is a flowchart of the traffic signal detection control process according to the present embodiment. Each of the process steps of FIG. 3 is executed by the computation unit 52 of the surrounding environment recognition device 14. In step S1 of FIG. 3, the recognition device 14 acquires respective types of sensor information Is from the sensor unit 12. The sensor information Is in this case includes the image information Ii from the camera 20, the vehicle velocity V from the vehicle velocity sensor 22, the yaw rate Yr from the yaw rate sensor 24, the current position Pc, and the map information Im from the map information supply device 26.

In step S2, the computation unit 52 (road line detecting unit 60) detects the road lines 240l, 240r using the peripheral image 100 from the camera 20, and outputs road line information Il in relation to the road lines 240l, 240r. The road lines 240l, 240r can be defined by white lines or shoulders in the vicinity of the traveling lane 200 and the opposing lane 202. The road line information Il also includes information concerning the trajectory of the road lines 240l, 240r.

In step S3, the computation unit 52 (search window setting unit 62) sets specifications for the search windows 230a to 230c using the sensor information Is. In step S4, the computation unit 52 (search region setting unit 64) sets specifications for the search regions 232a to 232c using the sensor information Is.

In step S5, the computation unit 52 (traffic signal detecting unit 66) detects the traffic signal 210 while moving the search windows 230a to 230c within the search regions 232a to 232c.

(A2-2-3. Setting of Specifications for Search Windows 230a to 230c and Search Regions 232a to 232c (Steps S3, S4 of FIG. 3))

(A2-2-3-1. Initial Settings)

In the initial settings according to the present embodiment, three search regions 232a to 232c are used. The respective search regions 232a to 232c are set so that the distance L from the camera 20 becomes first through third predetermined values L1 to L3 (e.g., 30 m, 60 m, 90 m). Stated otherwise, the search region 232a is for near distance use, the search region 232b is for mid-distance use, and the search region 232c is for far distance use. However, the number of search regions 232 is not limited to three, and may be two or four or more (for example, any number from four to one hundred). In the present embodiment, for facilitating understanding, three search regions 232, which is a comparatively small number, are used. Further, one or two search regions 232 can be used selectively corresponding to the map information Im, etc.

The camera 20 of the present embodiment is attached to the vehicle 10, and the specifications of the camera 20, e.g., magnification and view angle, etc., are fixed. For this reason, a relationship is determined between the distance L from the camera 20, and the XY coordinates of the (two dimensional) peripheral image 100, as well as the area thereof in the XY plane or the like. Therefore, by setting the search regions 232 corresponding to the distance L, the traffic signal 210 can be detected more accurately.

Thus, according to the present embodiment, the search windows 230a to 230c and the search regions 232a to 232c are set to sizes corresponding with the first through third distances L1 to L3. More specifically, the search windows 230a to 230c and the search regions 232a to 232c are made smaller as the distance L from the camera 20 becomes farther away. Note that making the search regions 232a to 232c smaller implies not only making the lengths of both the X-direction (horizontal direction) and the Y-direction (vertical direction) smaller, but may include a case in which only the length in the Y-direction (vertical direction) is made smaller.

(A2-2-3-2. Correction Using Sensor Information Is)

Next, correction of the specifications of the search windows 230a. to 230c and the search regions 232a to 232c using the sensor information Is will be described.

(A2-2-3-2-1. Road Line Information Il)

Generally, traffic signals 210 exist laterally or upward of the traveling lane 200 and/or the opposing lane 202. For this reason, there is a low possibility for traffic signals 210 to exist at positions that are spaced apart from the traveling lane 200 and the opposing lane 202. Thus, according to the present embodiment, the lateral position of the search regions 232a to 232c is set to match with the trajectory of the road lines 240l, 240r (see FIG. 2). In this case, the length in the lateral direction of the search regions 232a to 232c becomes smaller than the initial settings. Along therewith, the range over which the search windows 230a to 230c are moved (or scanned) within the search regions 232a to 232c becomes narrower.

(A2-2-3-2-2. Vehicle Velocity V)

If the vehicle velocity V is high, the necessity to issue a notification of the illuminated state of a comparatively remote traffic signal 210 becomes higher, whereas if the vehicle velocity V is low, the necessity to issue a notification of the illuminated state of a comparatively remote traffic signal 210 becomes lower. Thus, according to the present embodiment, the sizes of the search windows 230a to 230c and the search regions 232a to 232c are changed to match with the vehicle velocity V. More specifically, if the vehicle velocity V is high, the first through third predetermined values L1 to L3 are made larger (e.g., 50 m, 100 m, 150 m) in relation to the distance L from the camera 20. On the other hand, if the vehicle velocity V is lower, the first through third predetermined values L1 to L3 are made smaller (e.g., 20 m, 40 m, 60 m) in relation to the distance L from the camera 20. In accordance therewith, the traffic signal 210 can be detected at a distance L that corresponds with the vehicle velocity V.

(A2-2-3-2-3. Yaw Rate Yr)

The trajectory of the road lines 240*l*, 240*r* is calculated based on the present peripheral image 100. For example, in the case that the absolute value of the left-oriented yaw rate Yr is large, the need to know the illumination state of the traffic signal 210 more to the left of the trajectory of the road lines 240*l*, 240*r* becomes higher. Similarly, in the case that the absolute value of the right-oriented yaw rate Yr is large, the need to know the illumination state of the traffic signal 210 more to the right of the trajectory of the road lines 240*l*, 240*r* becomes higher. Thus, according to the present embodiment, the lateral position of the search regions 232*a* to 232*c* is modified to match with the yaw rate Yr. For example, the search regions 232*a* to 232*c* are shifted to the left side corresponding to an increase in the absolute value of the left-oriented yaw rate Yr.

(A2-2-3-2-4. Map Information Im)

Among the map information Im, concerning the distance information Ilmap to the traffic signal 210, a decision process is utilized to determine which of the search windows 230*a* to 230*c* and the search regions 232*a* to 232*c* will be used. For example, if the next traffic signal 210 is at a position that is farther away than the third predetermined value L3, the computation unit 52 uses only the search window 230*c* and the search region 232*c*, and the search windows 230*a*, 230*b* and the search regions 232*a*, 232*b* are not used. Conversely, if the next traffic signal 210 exists only in the vicinity of the first predetermined value L1, and the next traffic signal 210 thereafter is at a position that is considerably farther than the third predetermined value L3, the computation unit 52 uses only the search window 230*a* and the search region 232*a*, and the search windows 230*b*, 230*c* and the search regions 232*b*, 232*c* are not used.

Among the map information Im, concerning information (height information Ihmap) of the height H of the traffic signal 210, the range of the search regions 232*a* to 232*c* in the Y-axis direction (height direction) is limited in combination with the road line information Il and the distance information Ilmap.

In the case that information (shape information) of the shape of the traffic signal 210 is included in the map information Imp in combination with the road line information Io or the distance information Ilmap, the range of the search regions 232*a* to 232*c* is changed in the X-axis direction (horizontal direction) and the Y-axis direction (height direction). For example, in comparison with a case in which the shape of the light emitting section 214 is horizontally long, for a case in which the shape of the light emitting section 214 is vertically long, the X-axis direction of the search regions 232*a* to 232*c* is made short, whereas the Y-axis direction thereof is made long. Accordingly, the range (and position) of the search regions 232*a* to 232*c* is set corresponding to the shape of the light emitting section 214.

(A2-2-4. Detection of Traffic Signal 210 (Step S5 of FIG. 3))

The traffic signal detecting unit 66 moves (or scans) the search windows 230*a* to 230*c* within the search regions 232*a* to 232*c* to thereby detect the traffic signal 210. For example, while the search window 230*a* is scanned from the left toward the right within the search region 232*a*, the traffic signal detecting unit 66 determines whether or not characteristics (e.g., shape, color, etc.) of the light emitting section 214 or the lamps 220, 222, 224 of the traffic signal 210 exist within the search window 230*a*. Next, while the search window 230*a* is scanned from the left toward the right at a position lowered by a predetermined distance, the computation unit 52 determines whether or not the characteristics (e.g., shape, color, etc.) of the traffic signal 210 exist within the search window 230*a*. By repeating the above steps, the search window 230*a* is scanned over the entirety of the search region 232*a*. The same description applies to the search windows 230*b*, 230*c*.

During scanning of the search windows 230, the position of the search windows 230 at the present time is set so as to overlap with the previous position of the search windows 230, at which the presence or absence of the traffic signal 210 characteristics was determined. Stated otherwise, the offset amount of the previous search windows 230 to the present search windows 230 is shorter than the horizontal width (e.g., half the horizontal width) of the search windows 230. Consequently, even in the case that only a portion of the characteristics of the traffic signal 210 appear within the previous search window 230*a* and the traffic signal 210 could not be detected, by all of the characteristics of the traffic signal 210 appearing within the present search window 230*a*, the detection sensitivity for detecting the traffic signal 210 can be increased. Further, overlapping of the previous position and the present position can be performed not only in the horizontal direction, but in the vertical direction as well.

[A3. Advantages of the Present Embodiment]

As described above, according to the present embodiment, the search regions 232*a* to 232*c* used during detection of the traffic signal 210 become smaller as the distance L from the camera 20 (image capturing unit) is farther away (see FIG. 2). Therefore, the traffic signal 210 can be detected with a small processing burden or computational load corresponding to the distance L from the camera 20. Alternatively, by shortening the processing cycle required to carry out searching of the search regions 232, the detection accuracy at which traffic signals 210 are detected can be improved.

In the present embodiment, the traffic signal detecting unit 66 sets the search windows 230*a* to 230*c* for searching inside of the search regions 232*a* to 232*c*, and scans the search windows 230*a* to 230*c* within the search regions 232*a* to 232*c* to thereby detect the traffic signal 210 (FIG. 2, step S5 of FIG. 3). Further, the search windows 230*a* to 230*c* become smaller as the distance L from the camera 20 is farther away (FIG. 2). According to this feature, the traffic signal 210 can be detected accurately by the search windows 230*a* to 230*c* corresponding to the distance L from the camera 20.

In the present embodiment, the surrounding environment recognition device 14 is equipped with the road line detecting unit 60 (road line recognition device) that recognizes the road lines 240*l*, 240*r* (FIG. 1). The traffic signal detecting unit 66 changes the position of the search regions 232*a* to 232*c* corresponding to the position of the road lines 240*l*, 240*r* (FIG. 2). According to this feature, by removing from the search regions 232*a* to 232*c* ranges in which the traffic signal 210 cannot exist due to the relation thereof with the road lines 240*l*, 240*r*, the computational load can be lightened, or accuracy can be enhanced accompanying shortening of the search cycle.

In the present embodiment, the road line detecting unit 60 (road line recognition device) acquires information of the distance Lsmap (distance information Ilmap) to the traffic signal 210 from the map DB (the storage device that is incorporated in the vehicle) of the map information supply device 26, and sets the search regions 232*a* to 232*c* based on the distance information Ilmap (step S4 of FIG. 3). According to this feature, by specifying the distance L to the traffic signal 210 using the distance information Ilmap, and setting the search regions 232a to 232c based on the distance L, the accuracy in detecting the traffic signal 210 can be enhanced, or a reduction in computational load can be realized.

In the present embodiment, the road line detecting unit 60 (road line recognition device) acquires information of the height H (height information) of the traffic signal 210 from the map DB (the storage device that is incorporated in the vehicle) of the map information supply device 26, and sets the search regions 232a to 232c based on the height information of the traffic signal 210 (step S4 of FIG. 3). According to this feature, by specifying the height H of the traffic signal 210 using the height information, and setting the search regions 232a to 232c based on the height H, the accuracy in detecting the traffic signal 210 can be enhanced, or a reduction in computational load can be realized.

B. Modifications

The present invention is not limited to the above embodiment, but various arrangements may be adopted based on the disclosed content of the present specification. For example, the following arrangements can be adopted.

[B1. Object in which Recognition Device 14 is Incorporated]

In the present embodiment, the recognition device 14 is incorporated in a vehicle 10. However, the invention is not limited to this feature, and the recognition device 14 may be incorporated in other objects. For example, the recognition device 14 can be used in mobile objects such as ships and aircraft, etc. Further, the recognition device 14 is not limited to being incorporated in mobile objects, and insofar as an apparatus or system is provided for detecting traffic signals 210, the recognition device 14 may be used in another apparatus or system.

[B2. Sensor Unit 12]

In the sensor unit 12 of the present embodiment, there are included the camera 20, the vehicle velocity sensor 22, the yaw rate sensor 24, and the map information supply device 26 (see FIG. 1). However, for example, from the standpoint of utilizing the search windows 230a to 230c and the search regions 232a to 232c, the invention is not limited to this feature. For example, it is possible for one or more of the vehicle velocity sensor 22, the yaw rate sensor 24, and the map information supply device 26 to be omitted. In the case that the map information supply device 26 is omitted (or stated otherwise, if the map information Im is not used), traffic signals 210 are searched for using all of the search regions 232 for each of the distances L from the camera 20.

Alternatively, in addition to or in place of one or more of the vehicle velocity sensor 22, the yaw rate sensor 24, and the map information supply device 26, other sensors can be used.

As one such other sensor, for example, an inclination sensor for detecting an inclination A [deg] of the vehicle 10 (vehicle body) can be used. Corresponding to the inclination A, the computation unit 52 can correct the position in the Y direction (vertical direction) of the search windows 230a to 230c and the search regions 232a to 232c.

In the present embodiment, a situation has been assumed in which the camera 20 is fixed to the vehicle 10. However, from the standpoint of acquiring a peripheral image 100 in the direction of travel of the vehicle 10 (or mobile object), the invention is not necessarily limited to this feature. For example. the camera 20 may be incorporated in a mobile information terminal possessed by a passing pedestrian outside of the vehicle 10.

The camera 20 of the present embodiment is attached to the vehicle 10, and the specifications of the camera 20, e.g., magnification and view angle, etc., are fixed. However, from the standpoint of acquiring a peripheral image 100 in the direction of travel of the vehicle 10 (or mobile object), the invention is not necessarily limited to this feature. For example, the specifications of the camera 20 may be variable.

If the specifications of the camera 20 are variable, the current specifications of the camera 20 are notified to the computation unit 52 of the recognition device 14 from a control unit (not shown) of the camera 20. In addition, the computation unit 52 may set the search windows 230a to 230c and the search regions 232a to 232c to match with the current specifications of the camera 20. For example, if the magnification or view angle of the camera 20 is changed, even if the distance L from the camera 20 is the same, the appearance of the peripheral image 100 changes. Therefore, the computation unit 52 sets the search windows 230a to 230c and the search regions 232a to 232c to sizes that match with the change in appearance of the peripheral image 100.

Alternatively, even if the camera 20 is attached to the vehicle 10 and the specifications such as the magnification, view angle, etc., are fixed, a situation may be considered in which the specifications of plural types of cameras 20 that are disposed in different vehicles 10 are processed by computation units 52 having the same specification. In this case, specifications of the cameras 20 are stored beforehand in storage units (not shown) on the side of the cameras 20, and the computation units 52 may be used to read out the specifications of the cameras 20 from the storage units thereof.

With the above embodiment, the map DB 32 of the map information supply device 26 is disposed in the vehicle 10 (FIG. 1). However, from the standpoint of acquiring map information Im, for example, the computation unit 52 may acquire map information Im from a non-illustrated external server (external device) or a roadside beacon.

[B3. Surrounding Environment Recognition Device 14]

The recognition device 14 of the above embodiment includes the road line detecting unit 60 (FIG. 1). However, for example, insofar as the search windows 230a to 230c and the search regions 232a to 232c are capable of being utilized, the road line detecting unit 60 can be omitted.

[B4. Driving Assistance Unit 16]

The driving assistance unit 16 of the above embodiment includes the brake device 70 and the warning device 72 (FIG. 1). However, for example, from the standpoint of utilizing the search windows 230a to 230c and the search regions 232a to 232c, the invention is not limited to this feature. For example, it is possible for one or both of the brake device 70 and the warning device 72 to be omitted.

Alternatively, in addition to or in place of the brake device 70 and/or the warning device 72, a different type of driving assistance device can be provided. As examples of such different types of driving assistance devices, there can be included a device (high efficiency driving support device) for notifying the driver for the purpose of improving energy efficiency (fuel consumption, etc.). The high efficiency driving support device can assist in high efficiency driving by prompting the driver to control the vehicle velocity V so that the vehicle 10 is not required to stop at traffic signals 210.

The warning device 72 of the above embodiment serves to notify the driver of the existence of a traffic signal 210 by displaying information on the display device 90 (see FIG. 1). However, for example, from the standpoint of notifying the driver of the existence of a traffic signal 210, the invention is not limited to this feature. For example, in addition to or in place of a display, the driver can be notified of the existence of the traffic signal 210 by way of a voice output from a speaker.

[B5. Traffic Signal Detection Control]

In the above embodiment, the search windows 230a to 230c and the search regions 232a to 232c are set (step S3, S4 of FIG. 3) using the image information Ii, the road line information Il, the vehicle velocity V, the yaw rate Yr, and the map information Im. However, for example, from the standpoint of utilizing the search windows 230a to 230c and the search regions 232a to 232c, the invention is not limited to this feature. For example, it is possible for one or more of the road line information Ii, the vehicle velocity V, the yaw rate Yr, and the map information Im not to be used. In the case that only the image information Ii is used without using the road line information Il, the computation unit 52 may use fixed positions for the search regions 232a to 232c.

What is claimed is:

1. A surrounding environment recognition device comprising:
    an image capturing device that captures a peripheral image; and
    a traffic signal detecting controller, which sets a search region with respect to the peripheral image, and detects a traffic signal inside of the search region,
    wherein the traffic signal detecting controller sets a search window smaller than the search region and indicative of a range for searching inside of the search region, and scans the search window within the search region to detect the traffic signal,
    the search region is controlled to be smaller as a distance from the image capturing device is farther away, and
    the search window is controlled to be smaller as the distance from the image capturing device is farther away.

2. The surrounding environment recognition device according to claim 1, wherein:
    the surrounding environment recognition device further comprises a road line recognition device that recognizes a road line; and
    the traffic signal detecting controller changes a position of the search region corresponding to a position of the road line.

3. The surrounding environment recognition device according to claim 2, wherein the road line recognition device acquires distance information to the traffic signal from an external device or from a storage device incorporated in the vehicle, and sets the search region based on the distance information to the traffic signal.

4. The surrounding environment recognition device according to claim 2, wherein the road line recognition device acquires height information of the traffic signal from an external device or from a storage device incorporated in the vehicle, and sets the search region based on the height information of the traffic signal.

5. The surrounding environment recognition device according to claim 1, wherein the traffic signal detecting controller changes sizes of the search window and the search region depending on a velocity of a vehicle incorporating the surrounding environment recognition device.

6. The surrounding environment recognition device according to claim 1, wherein the traffic signal detecting controller changes a lateral position of the search region depending on a yaw rate of a vehicle incorporating the surrounding environment recognition device.

7. The surrounding environment recognition device according to claim 1, wherein the traffic signal detecting controller changes a range of the search region depending on shape information of the traffic signal included in map information.

8. The surrounding environment recognition device according to claim 1, wherein when scanning the search window, the traffic signal detecting controller sets a position of the search window at the present time so as to be overlapped with a previous position of the search window, at which presence or absence of characteristics of the traffic signal was determined.

9. The surrounding environment recognition device according to claim 1, wherein the traffic signal detecting controller is connected to a driving assistance controller of a vehicle and supplies a detection result of the traffic signal to the driving assistance controller to activate a driving assistance control.

* * * * *